(12) United States Patent
Yang et al.

(10) Patent No.: US 12,023,988 B2
(45) Date of Patent: Jul. 2, 2024

(54) AUTOMOTIVE SEAT BASED MICROCLIMATE SYSTEM

(71) Applicant: Gentherm Incorporated, Northville, MI (US)

(72) Inventors: Jun Yang, Windsor (CA); Tyler Myers, Plymouth, MI (US); Jeff Arsenault, Plymouth, MI (US); Alan Chewter, Ypsilanti, MI (US)

(73) Assignee: Gentherm Incorporated, Northville, MI (US)

( * ) Notice: Subject to any disclaimer, the term of this patent is extended or adjusted under 35 U.S.C. 154(b) by 288 days.

(21) Appl. No.: 17/776,086

(22) PCT Filed: Dec. 4, 2020

(86) PCT No.: PCT/US2020/063349
§ 371 (c)(1),
(2) Date: May 11, 2022

(87) PCT Pub. No.: WO2021/102449
PCT Pub. Date: May 27, 2021

(65) Prior Publication Data
US 2022/0388372 A1 Dec. 8, 2022

Related U.S. Application Data

(60) Provisional application No. 62/937,890, filed on Nov. 20, 2019.

(51) Int. Cl.
B60H 1/00 (2006.01)
(52) U.S. Cl.
CPC ..... B60H 1/00878 (2013.01); B60H 1/00207 (2013.01); B60H 1/0073 (2019.05); B60H 2001/00114 (2013.01)

(58) Field of Classification Search
CPC .......... B60H 1/00878; B60H 1/00207; B60H 1/0073; B60H 1/2218; B60H 1/2225; B60H 2001/00114
See application file for complete search history.

(56) References Cited

FOREIGN PATENT DOCUMENTS

DE   112015002482 T5   3/2017
DE   102017217564 A1 * 4/2019
(Continued)

OTHER PUBLICATIONS

International Search Report and Written Opinion for International Patent Application No. PCT/US2020/063349 mailed on Feb. 25, 2021.

Primary Examiner — Emmanuel E Duke
(74) Attorney, Agent, or Firm — Carlson, Gaskey & Olds, P.C.

(57) ABSTRACT

A microclimate system for a vehicle occupant includes multiple microclimate thermal effectors. Each of the microclimate thermal effectors at least partially controls a climate in at least one of multiple occupant zones. Each of the microclimate thermal effectors includes a sensor configured to determine microclimate temperature data corresponding to the zone. A controller includes an input configured to receive vehicle temperature data including cabin temperature and outside air temperature from a vehicle data bus. The controller fuses the microclimate temperature data with the vehicle temperature data and determines an estimated local equivalent temperature for each of the microclimate thermal effectors. The controller further provides a temperature command to each of the microclimate thermal effectors based upon the estimated local equivalent temperature corresponding to the microclimate thermal effector.

16 Claims, 9 Drawing Sheets

(56) References Cited

FOREIGN PATENT DOCUMENTS

| DE | 102017217564 A1 | 4/2019 | |
|----|----|----|----|
| EP | 1236593 A2 | 9/2002 | |
| WO | 2016070047 A1 | 5/2016 | |
| WO | WO-2016070047 A1 * | 5/2016 | ......... B60H 1/00271 |
| WO | WO-2018049159 A1 * | 3/2018 | ......... B60H 1/00207 |

* cited by examiner

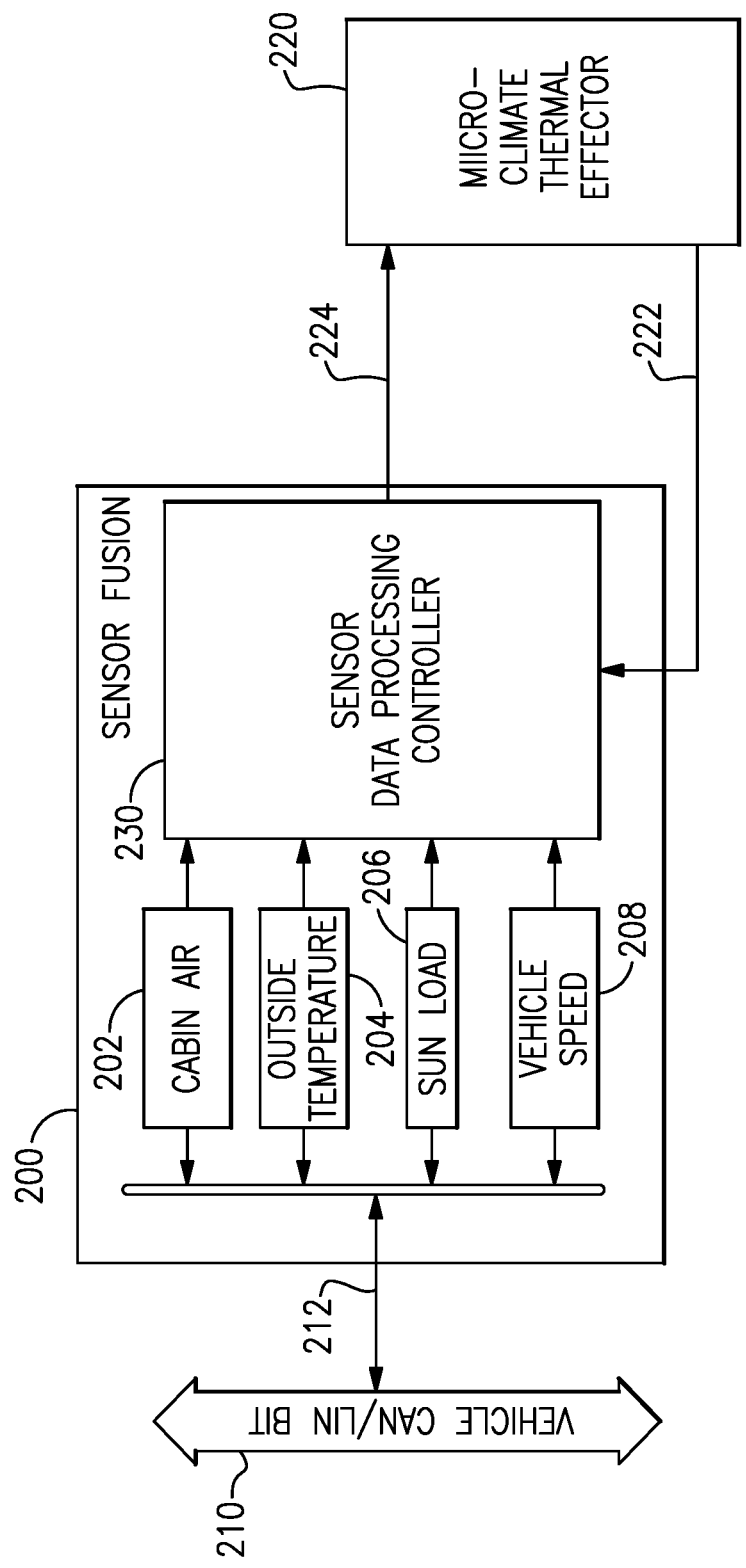

FIG.2

EQUATION 1: $T_{local} = W_1 \times (T_{cabin} + b_{tv}) + W_2 \times T_{outside} + W_3 \times SL_{nor} + W_4 \times V + W_5 \times T_{lf}$ Where:
- $W_i$    $i=1,2,3,4,5$: calibratable weighting factor
- $T_{cabin}$    cabin temperature
- $b_{tv}$    temperature vertical stratification factor/offset
- $T_{outside}$    outside temperature
- $SL_{nor}$    normalized sunload
- $V$    vehicle speed
- $T_{lf}$    local effector temperature feedback

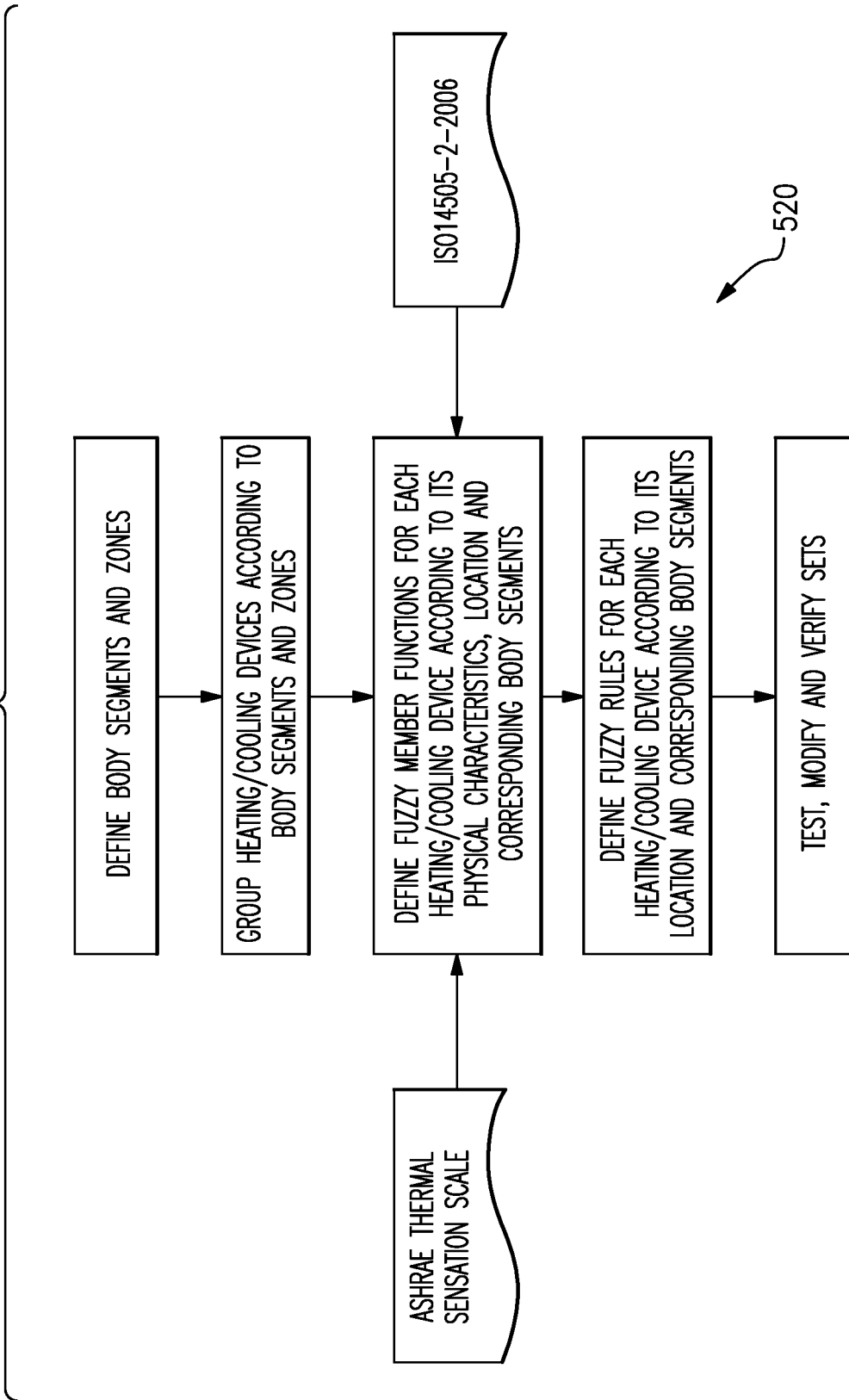

AUTOMOTIVE SEAT BASED MICROCLIMATE SYSTEM

CROSS-REFERENCE TO RELATED APPLICATION

This application claims priority to U.S. Provisional Application No. 62/937,890 filed Nov. 20, 2019.

TECHNICAL FIELD

This disclosure relates to microclimate system that provides increased thermal comfort to the occupant using sensor fusion and fuzzy logic.

BACKGROUND

In traditional automotive HVAC or climate systems, the control system uses temperatures from sensors mounted in different locations within the cabin or calculates temperature using a mathematical cabin thermal model. In recent years, seat based microclimate systems have become more desirable because of their fast time to comfort and lower energy consumption compared to prior systems.

An automotive seat-based microclimate system has many conductive, convective and radiative devices, like heater mats, thermo-electric devices (TED)s, positive temperature coefficient thermistors (PTCs) and mini-compressor systems located in the seat and surrounding area. Calculating local temperature accurately for local heating/cooling device control is important for controlling local thermal comfort, but is difficult to achieve with current systems.

The current methods for automotive seat based microclimate systems are discrete ON/OFF or modulated power (PWM) control based on fixed temperature setpoints (typically 3 to 5 discrete levels). The occupant manually selects one of these predefined temperature setpoints to adjust for changing conditions in the vehicle and human body. Additionally, since levels are discrete, the user may be forced to change levels to "hunt" for an unobtainable setting.

Fuzzy logic has been disclosed as an option for bulk air heating and cooling in aircraft cabins. Fuzzy logic is an approach to algorithms that utilizes "degrees of truth" rather than the binary extremes of true (1)/false (0). Fuzzy logic includes the extreme cases, but also includes multiple states between true and false such that the comparison between two things can result in a value between true and false (e.g. the driver is comfortable is 0.45 (45%) true). Because the fuzzy logic is used to regulate the bulk air temperature, the rate of change in cabin temperature is used to create the fuzzy set rather that another metric. Regulating based upon temperature rate of change prevents undesired oscillations in cabin temperature from overshooting the desired cabin temperature.

SUMMARY

In one exemplary embodiment a microclimate system for a vehicle occupant includes multiple microclimate thermal effectors, each of the microclimate thermal effectors being configured to at least partially control a climate in at least one occupant zone of multiple defined occupant zones, each of the microclimate thermal effectors including a sensor configured to determine microclimate temperature data corresponding to the at least one occupant zone, a controller in communication with the microclimate thermal effectors, the controller having an input configured to receive vehicle temperature data from a vehicle data bus, the vehicle temperature data includes at least a cabin temperature and an outside air temperature, the controller being configured to fuse the microclimate temperature data with the vehicle temperature data and determine an estimated local equivalent temperature for each of the microclimate thermal effectors based on the fused data, the controller further being configured to provide a temperature command to each of the microclimate thermal effectors based upon the estimated local equivalent temperature corresponding to the microclimate thermal effector.

Another example of the above described microclimate system further includes a thermal control system in the vehicle having a first temperature sensor exposed to conditioned air from the thermal control system.

In another example of any of the above described microclimate systems the thermal control system in the vehicle is a heating ventilation and cooling (HVAC) system and the first temperature sensor is configured to detect the cabin temperature.

Another example of any of the above described microclimate systems includes a second temperature sensor exposed to air outside the vehicle, the second temperature sensor configured to detect the outside air temperature.

In another example of any of the above described microclimate systems multiple zones include at least two of a head zone, a seat back zone, a seat cushion zone, a hand/arm zone and a foot/leg zone.

In another example of any of the above described microclimate systems the microclimate thermal effectors are selected from the group comprising climate controlled seats, head rest/neck conditioner, climate controlled headliner, steering wheel, heated gear shifter, heater mat, and mini-compressor system.

In another example of any of the above described microclimate systems the controller is configured to apply a stratification offset to the cabin temperature to adjust for a location of the cabin temperature sensor.

In another example of any of the above described microclimate systems weighting factors are applied to the outside air temperature and the cabin temperature.

In another example of any of the above described microclimate systems a value of each weighting factors is dependent on at least one of a season and a climate region.

In another example of any of the above described microclimate systems the vehicle temperature data includes a vehicle solar load.

In another example of any of the above described microclimate systems the vehicle solar load is normalized, and a weighting factor is applied to the vehicle solar load, wherein the weighting factor compensates for vehicle specific features.

In another example of any of the above described microclimate systems the vehicle temperature data includes a vehicle speed.

In another example of any of the above described microclimate systems a weighting factor is applied to the vehicle speed wherein the weighting factor compensates for the seat's surrounding area effectors, including heating devices in a door panel and a floor area.

In another example of any of the above described microclimate systems a temperature feedback from at least one microclimate thermal effector is provided to the controller, and wherein the expected local temperature is determined for the at least one microclimate thermal effector based upon temperature feedback.

In another example of any of the above described microclimate systems the controller is configured to fuse the microclimate temperature data with the vehicle temperature data based upon the following equation:

$$T_{local} = W_1 \times (T_{cabin} + b_{tv}) + W_2 \times T_{outside} + W_3 \times SL_{nor} + W_4 \times V + W_5 \times T_{lf}$$

Where: $W_i$ i+1, 2, 3, 4, 5; calibratable weighting factor
$T_{cabin}$ cabin temperature
$b_{tv}$ temperature vertical stratification factor or offset
$T_{outside}$ outside temperature
$SL_{nor}$ normalized sunload
V vehicle speed
$T_{lf}$ local effector temperature feedback In another example of any of the above described microclimate systems the controller determines a unique estimated local equivalent temperature for each of the selected microclimate thermal effectors based upon the equation.

BRIEF DESCRIPTION OF THE DRAWINGS

The disclosure can be further understood by reference to the accompanying drawings, comprising FIGS. 1-9.

FIG. 2 schematically illustrates a sensor fusion processor for fusing microclimate sensor data and other vehicle sensor data into a single vehicle sensor set.

FIG. 6 schematically illustrates an exemplary fuzzy logic control.

The embodiments, examples and alternatives of the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a microclimate system that provides increased thermal comfort to the occupant by controlling microclimate thermal effectors using sensor fusion and fuzzy logic.

Figure 1:
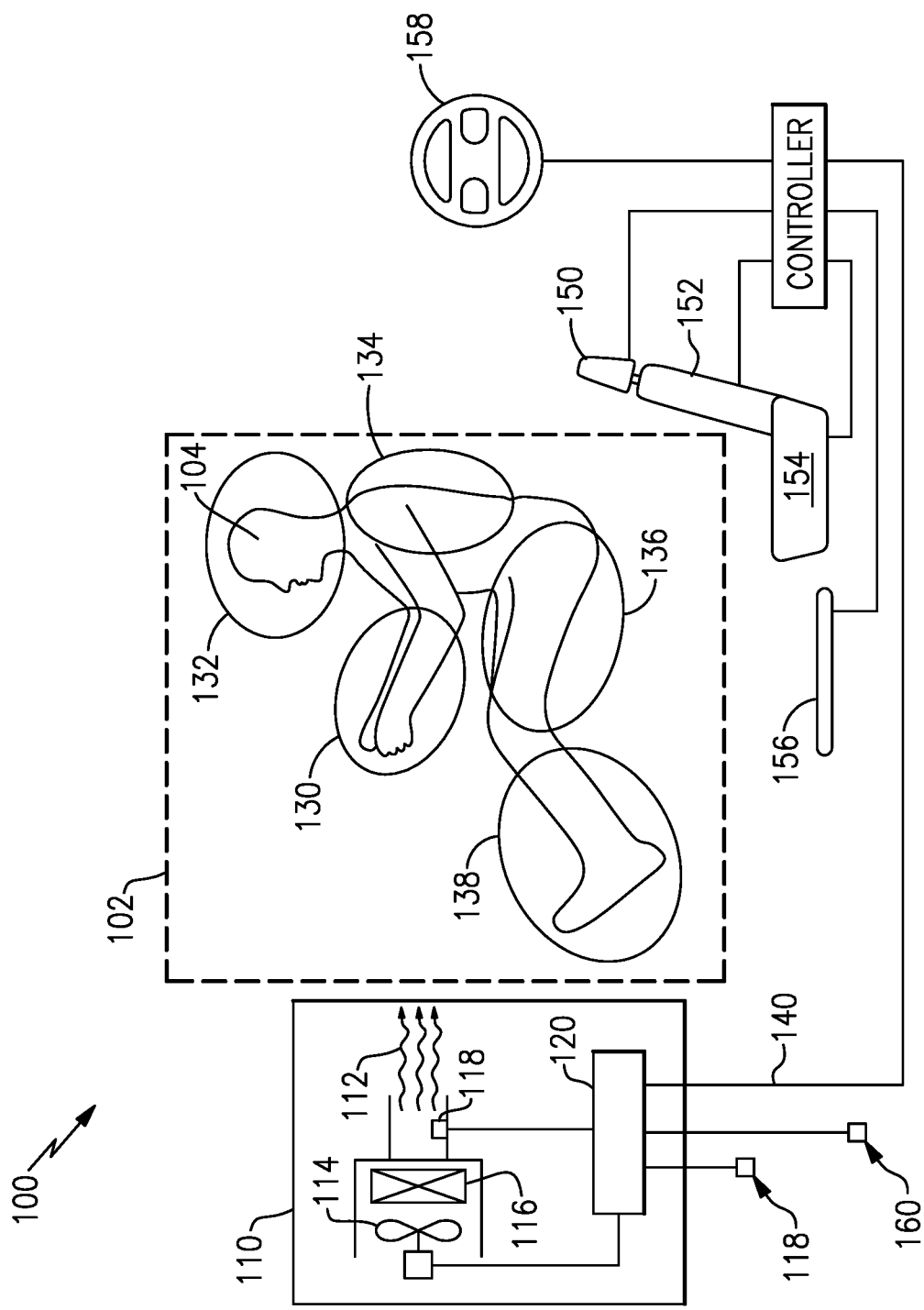
FIG. 1 schematically illustrates a vehicle heating ventilation and cooling system.

Referring to FIG. 1, a vehicle 100 has a heating, ventilation and air conditioning (HVAC) system 110 that is used to condition the air 112 and control the bulk temperature of the air within the vehicle cabin 102. A typical HVAC system 110 has ducting that supplies conditioned air 112 to the cabin 102 using a blower 114 moving air over a heat exchanger 116. A sensor 118 monitors the temperature of the conditioned cabin air 112, and a controller 120 regulates operation of the HVAC system 110 to a temperature set point that is typically manually adjusted by an occupant 104. The central HVAC 110 system is insufficient to achieve thermal comfort for each specific occupant 104 and location in many scenarios, such as those where multiple different occupants 104 are in the same cabin 102, so microclimate devices or thermal effectors are used to create a unique microclimate for each occupant 104 in the cabin 102, thereby providing improved overall thermal comfort for each occupant 104.

As a further challenge to providing an effective climate control system, each occupant 104 typically has unique personal comfort preferences. That is, a particular occupant 104 detects a level of thermal energy differently than another occupant 104. As a result, the exact same thermal environment within a vehicle 100 may be perceived as comfortable by one occupant 104, but as uncomfortable by another occupant 104. To this end, the vehicle 100 includes an integrated approach to human thermal management by controlling both the central HVAC system 110, or any other thermal control system in the vehicle 110, as well as various microclimate thermal effectors using fuzzy logic to coordinate and optimize comfort for each occupant 104 of the vehicle 100.

With continuing reference to FIG. 1, an example microclimate system may have multiple discrete occupant microclimate zones. According to ISO 145045-2:2006 (E), a human body can be divided into different body segments, such as hand, head or chest, and each segment has a different thermal comfort temperature range. The five example microclimate zones in FIG. 1 are: head 132, back 134, cushion 136 (thigh and buttocks), foot/leg 138, and arm/hand 130. Fewer, more and/or different zones may be used if desired, depending on the specific microclimate system and the needs of a given vehicle. In the disclosed microclimate system an estimated local equivalent temperature $T_{local}$ is calculated on a per device/body region basis, i.e., by individual zones 130, 132, 134, 135, 136, 138.

Microclimate thermal effectors are localized components that can adjust or maintain a desired microclimate in a corresponding zone 130, 132, 134, 136, 138. The microclimate thermal effectors can include, for example, climate controlled seats (e.g., U.S. Pat. Nos. 5,524,439 and 6,857,697), a head rest/neck conditioner (e.g., U.S. Provisional App. No. 62/039,125), a climate controlled headliner (e.g., U.S. Provisional App. No. 61/900,334), a steering wheel (e.g., U.S. Pat. No. 6,727,467 and U.S. Pub. No. 2014/0090513), a heated gear shifter (e.g., U.S. Pub. No. 2013/0061603, etc.), heater mats, a mini-compressor system, and/or any other systems configured to achieve a personalized microclimate. The enumerated microclimate thermal effectors are exemplary in nature and are non-limiting. The microclimate system provides a corresponding occupant 104 personal comfort in an automated manner with little or no input from the corresponding occupant 104. All or some of the microclimate thermal effectors can be arranged to optimally control the thermal environment around an occupant of a seat located anywhere inside a passenger vehicle. In addition, the microclimate thermal effectors can be used to regulate thermal comfort separately for individual segments of the occupant's body.

Occupant variables such as activity level and clothing are also considered by a local equivalent homogeneous temperature (EHT) model by considering the season, outside air temperature (determined via an outside air sensor 118) and/or the region. User information such as gender, height, weight and age may also be provided to a sensor fusion processor in the controller 120. By combining the data from a vehicle data bus 140 (e.g., CAN, LIN, PWM HVAC signal, or any other data bus) and feedback from local conductive, radiative or convective heating/cooling microclimate thermal effectors within a headrest 150, a seat back 152, a seat cushion 154, a floormat 156, a steering wheel 158, each microclimate system accurately estimates the local equivalent homogenous temperature, or estimated local equivalent temperature, $T_{local}$, for the corresponding zone 130, 132, 134, 136, 138 which is then used for local thermal comfort prediction and heating/cooling control. Thus, a discrete local temperature can be obtained with the microclimate thermal effectors at each of the five regions of the occupant's body.

The sensor fusion method provides an efficient and accurate way to estimate local environment temperatures at each of the microclimate zones 130, 132, 134, 136, 138. Referring to FIG. 2, a sensor fusion processor 200 acquires vehicle cabin temperature/velocity 202, outside air temperature 204, sun load 206, vehicle speed and/or other data from a vehicle data bus 210 or from any available in vehicle sensors 160 (see FIG. 1) and includes a sensor fusion controller 210.

The sensor fusion controller 210 acquires temperature feedback from each thermal effector (i.e. each local heating/cooling device). Exemplary automotive seat-based occupant thermal comfort control systems can utilize many conductive, convective or radiative heating and cooling devices to achieve optimal occupant comfort.

In the example microclimate system, multiple microclimate thermal effectors are configured to thermally condition multiple occupant zones 130, 132, 134, 136, 138. Each of the microclimate thermal effectors generates microclimate temperature data, which is provided by a temperature sensor (e.g., a negative temperature coefficient (NTC) element) that is incorporated into each of the microclimate thermal effectors 220. Non-limiting examples of microclimate thermal effectors 220 include climate controlled seats, head rest/neck conditioners, climate controlled headliners, steering wheels, heated gear shifters, heater mats, other heated surfaces and mini-compressor systems. Other example microclimate thermal effectors include radiative console and/or door surfaces, radiant heater panels, and liquid loop based cooling devices (devices which convert conditioned glycol to localized cooling).

One or more controllers 230 within the sensor fusion controller 200 are in communication with each of the microclimate thermal effectors 220. The controller 230 includes one or more inputs 212 configured to receive vehicle temperature data from a vehicle data bus 210. The controller 230 fuses the microclimate temperature data 222 received from the microclimate thermal effectors 220 with the vehicle temperature data received from the vehicle data bus 210 using an algorithm (e.g. Equation 1) to determine an estimated local equivalent temperature $T_{local}$ for each of the microclimate thermal regions/zones. The controller provides a temperature command 224 to each of the microclimate thermal effectors 220 based upon its estimated local equivalent temperature $T_{local}$ to achieve occupant thermal comfort at each individual zone 130, 132, 134, 136, 138.

One example sensor fusion equation (Equation 1) calculates estimated local equivalent temperature $T_{local}$ for each microclimate thermal region/zone, as follows.

$$T_{local}=W_1\times(T_{cabin}+b_{tv})+W_2\times T_{outside}+W_3\times SL_{nor}+W_4\times V+W_5\times T_{lf}$$

Where: $W_i$ i+1, 2, 3, 4, 5; calibratable weighting factor
$T_{cabin}$ cabin temperature
$b_{tv}$ temperature vertical stratification factor or offset
$T_{outside}$ outside temperature
$SL_{nor}$ normalized sunload
V vehicle speed
$T_{lf}$ local effector temperature feedback The vehicle temperature data includes cabin temperature $T_{cabin}$, outside air temperature $T_{outside}$, vehicle solar load $SL_{nor}$, and vehicle speed V. The weighting factors $W_i$ may be different based upon the particular microclimate thermal effector 220. A skilled artisan can select the particular weighting factor to be used for each control portion (i) based on the particular microclimate thermal effectors 220 and the expected/experienced conditions of the thermal effector(s) 220 affecting the control potion (i).

Most vehicles have a single interior air temperature sensor, but if one were to measure local temperatures inside the vehicle at any given time the temperatures would be very different, especially if you have a sunny day (i.e. the vehicle has a high solar load). The algorithm allows adjustments based on how well the interior cabin sensor actually correlates to local temperatures and is unique for each car. The temperature vertical stratification or offset $b_{tv}$ adjusts the cabin air temperature for the level of stratification in a particular zone e.g. "breath level" would be used in the zone around the head of the occupant 104. Similarly, if the cabin air temperature sensor is located at approximately the same level as the steering wheel, then there may be no offset for back zone 134 and the hand/arm zone 130. However, there may be a negative offset for the foot/leg zone 138 or the seat zone 136, and a positive offset for the head zone 132. The weighting factor $W_1$ provides further adjustments for each microclimate thermal region/zone 130, 132, 134, 136, 138. For example, the cabin temperature in the head zone 132 may have a greater weighting factor $W_1$ than the hand/arm zone 130.

Weighting factor $W_2$ adjusts the outside temperature and its effects on each microclimate thermal effector. For example, the outside temperature in the hand/arm zone 130 may have a bigger weighting factor than in the seat zone 136. In a cold ambient when the vehicle is travelling quickly, additional "work" is needed from the door heaters to overcome the loss of heat through the door and side glass.

The vehicle solar load $SL_{nor}$ is normalized, and a weighting factor $W_3$ is applied to the vehicle solar load $SL_{nor}$ to account for a particular body segment which has direct sun exposure. For example, with a panoramic sun roof more solar radiant heating would enter the cabin and impact comfort. Conversely, the impact of sun could be reduced if the vehicle has special solar glazing, which reflects sun load.

Weighting factor $W_4$ adjusts for the effects of vehicle speed on the particular zone. The foot/leg zone 138 is particularly susceptible to effects of vehicle speed on local temperature. For example, the foot/leg zone 138 becomes particularly cold at high speeds in cold temperatures, so a larger weighting factor may be used for the foot/leg zone 138. The vehicle speed may have negligible effects on the back zone 134, for example, so the weighting factor may be used to zero-out the vehicle speed for the seat back thermal effector(s).

The microclimate temperature data 222 includes thermal effector feedback $T_{lf}$ that may also be adjusting using a weighting factor $W_5$. For example, the hand/arm zone 130 thermal effector(s) 220 may be given increased weight when a steering wheel heater is used, as that can have a large impact on occupant comfort in the hand/arm zone 130.

The effectiveness of the disclosed system is, in some examples, further enhanced by using fuzzy logic to predict the human body's thermal sensation and thereby the comfort of the human body in real time. By employing fuzzy logic control, each device in the system is automatically tuned to the correct temperature and flow rate set point based on the local environmental condition to meet the occupant's local body segment's thermal comfort expectations. Since each occupants' thermal expectations are unique, fuzzy logic is used to define a temperature set point for each thermal effector in such a manner that takes into account thermal comfort variations in an occupant population.

Figure 3:
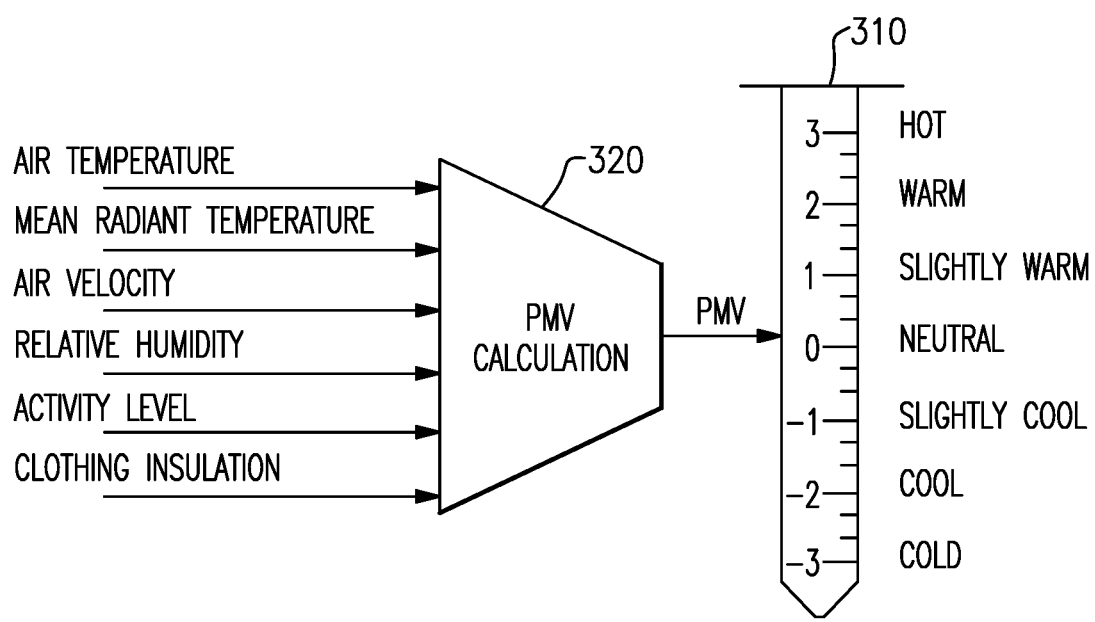
FIG. 3 schematically illustrates an exemplary thermal comfort ASHRAE scale ranging from −3 to 3.

In one example, an occupant thermal condition is expressed as the degree to which an occupant senses a hot or cold temperature, or changes and variations in temperature. These hot and cold sensations are represented using an ASHRAE (American Society of Heating, Refrigerating and Air-Conditioning Engineers) thermal sensation scale 310 from 3 (hot) to −3 (cold), as shown in FIG. 3, according to a predicted mean vote (PMV) methodology 320. In the disclosed system, the PMV calculation assigns a "hotness"/"coldness" value for each microclimate zone.

As an alternative to the hot and cold sensation scale shown in FIG. 3, an occupant thermal condition can be expressed using the Berkeley Sensation and Comfort Scale ("Berkeley scale"), described in, for example, Arens E. A., Zhang H. & Huizenga C. (2006) Partial- and whole-body thermal sensation and comfort, Part I: Uniform environmental conditions. *Journal of Thermal Biology*, 31, 53-59. It should be understood that other approaches can be used to quantify an occupant's thermal condition.

Figure 4A:
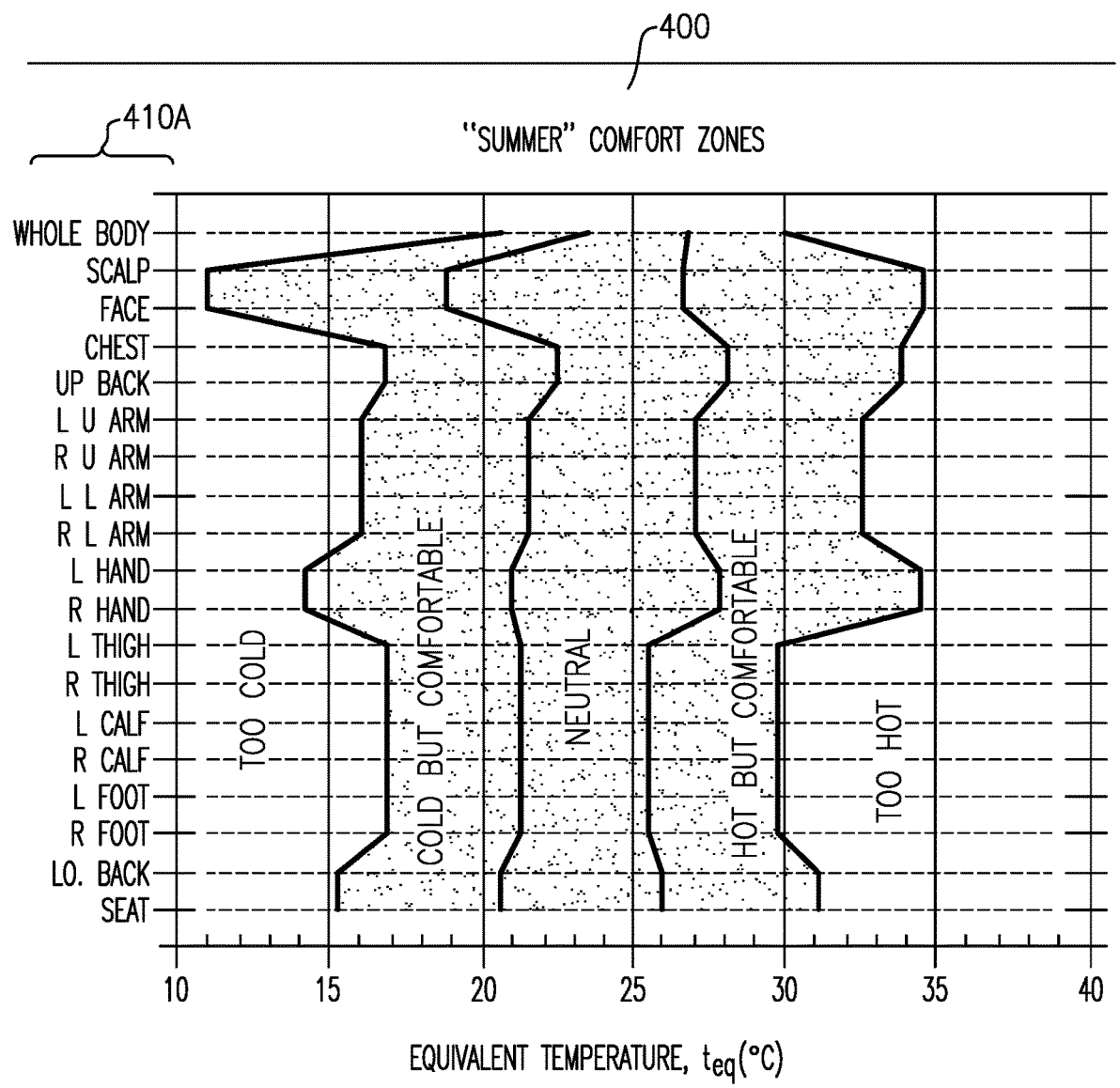
FIG. 4A illustrates an equivalent temperature for multiple regions during the summer.
Figure 4B:
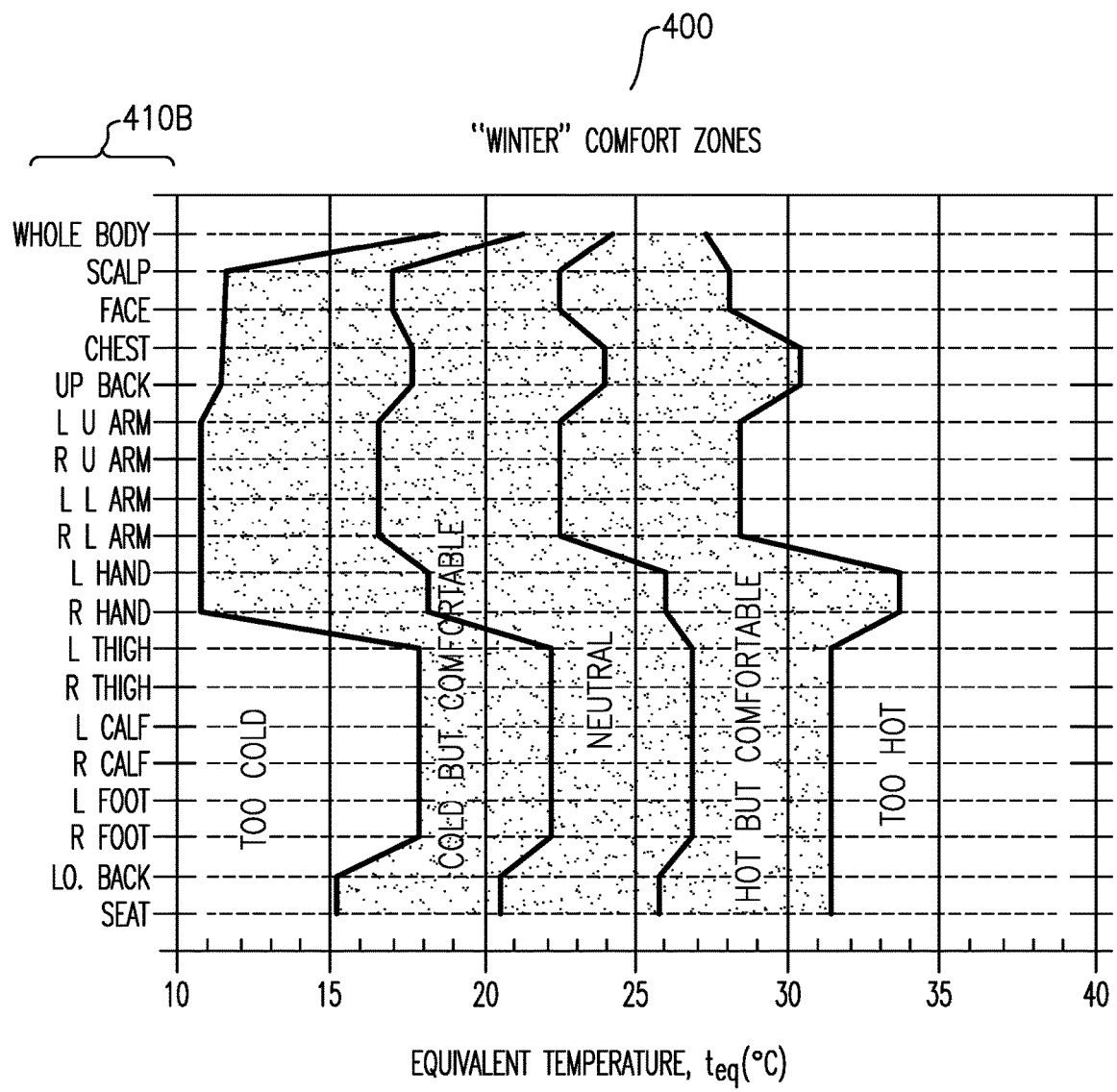
FIG. 4B illustrates an equivalent temperature for multiple regions during the winter.

The season may significantly affect the perceived occupant thermal comfort such that the PMV 320 outcome is different. So, the predicted occupant thermal comfort 400 may be adjusted based upon the season, as shown in FIGS. 4A and 4B, with FIG. 4A illustrated an equivalent temperature for multiple regions 410A during summer and FIG. 4B illustrating an equivalent temperature for the multiple regions 410B during the winter. Although only a five-value thermal scale is shown in FIGS. 4A and 4B ("too cold," "cold but comfortable," "neutral," "hot but comfortable," and "too hot"), it is appreciated that the thermal comfort can be further refined to correlate to the seven-value ASHRAE thermal sensation scale 310 (3 to −3) shown in FIG. 3.

Figure 5:
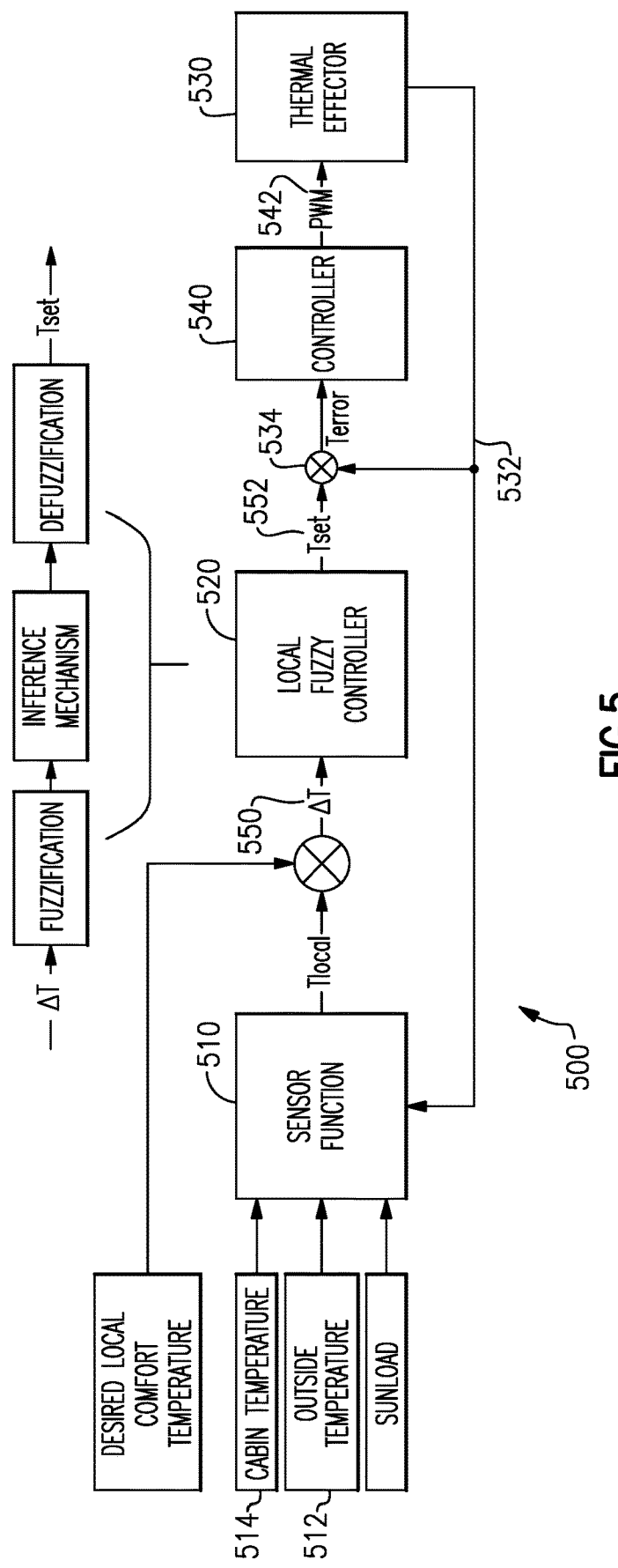
FIG. 5 schematically illustrates a basic architecture of an exemplary microclimate control system.

FIG. 5 schematically illustrates the basic architecture of an exemplary microclimate control system 500 that uses both sensor fusion 510 and fuzzy logic control 520 (illustrated in more detail in FIG. 6) to regulate each of the microclimate thermal effectors 530. The sensor fusion control scheme 500 compensates for important factors that affect occupant comfort including both environmental conditions 512 external to the vehicle and environmental conditions 514 within specific stratified layers of the cabin volume. The local effector temperature feedback $T_{LF}$ 532 (Feedback T) is provided in one example by a negative thermal coefficient (NTC) temperature sensor that is integrated into each thermal effector within each zone. The values from the local fuzzy logic controller 520 and NTC feedback 532 are provided to the PWM controller 540 to regulate the thermal effector 530. Other control functions may be used such as overheat protection, maximum temperature limits from the PWM controller, maximum holding times for a given temperature setpoint and the like, according to conventional control methodologies.

Referring to FIGS. 5-6, the local fuzzy logic controller 520 establishes temperature based fuzzy sets which are related to each local body segments' temperature range for comfort. Fuzzy rules are created according to each physical heating/cooling device's characteristics and location, and the fuzzy controller applies "fuzzy logic" in the automotive seat based occupant thermal comfort system (including other microclimate thermal effectors) to control each individual heating/cooling device's temperature dynamically.

As explained above in connection with the sensor fusion algorithm, the occupant thermal comfort system is divided into multiple comfort control zones (e.g., five) based on up to nineteen body segments and corresponding effectors in each seat location. The number of control zones can be more than five and up to nineteen (defined in ASHRAE model) according to unique conditions around the body. Approximately five zones are desirable in some examples from a perspective of user input to the system for customization and control due to the reduced complexity while the relationship between five comfort control zones and nineteen, for example, can be established mathematically, in order to translate from comfort related parameters to control related parameters.

There may be several heating and/or cooling devices impinging on the climate in each of the comfort control zones. Each of these devices may have its own control module. FIG. 5 shows the major functional subsystems within a typical heating and/or cooling control module 500.

Figure 7A:
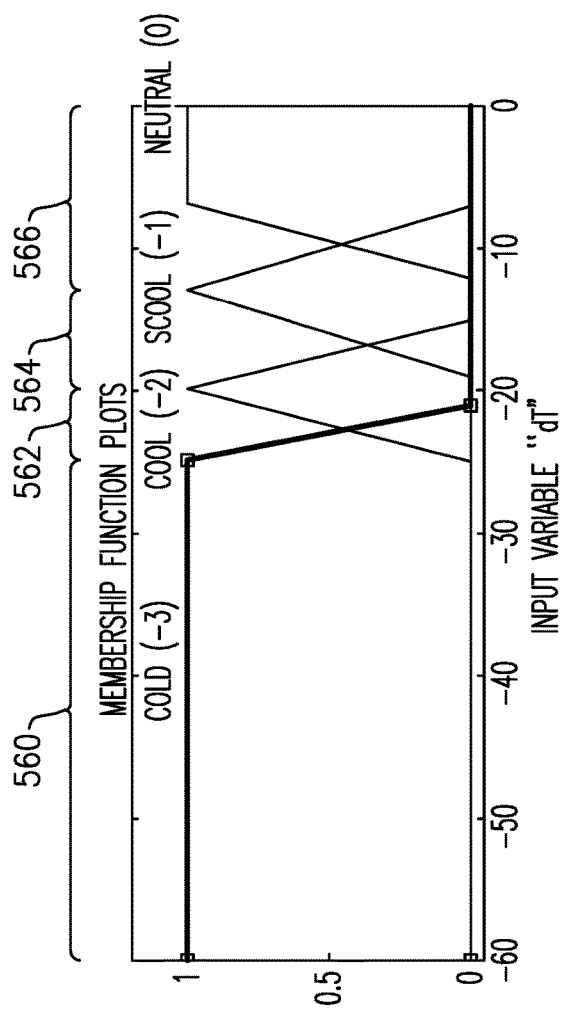
FIG. 7A schematically illustrates exemplary temperature environment fuzzy sets.
Figure 7B:
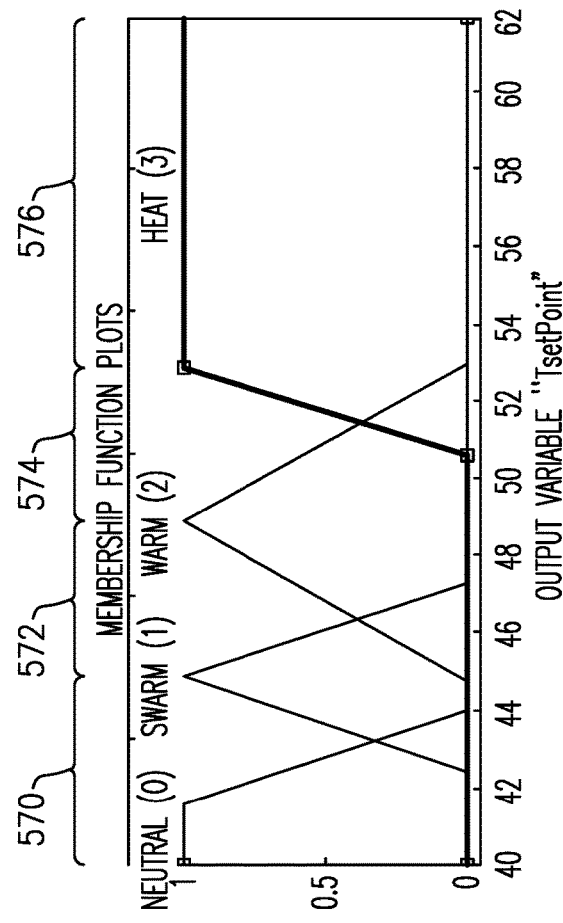
FIG. 7B schematically illustrates exemplary temperature environment fuzzy sets.

After collecting the vehicle data and feedback from all comfort control devices, the system generates localized temperature information for each control module based on the device location. The control module calculates $\Delta T$ 550 based on the local temperature and desired comfort temperature for the zone. In particular, $\Delta T$ 550 corresponds to the local temperature based upon the vehicle temperature data minus the desired, preset local comfort temperature for the given thermal effector. The fuzzy logic controller 520 takes $\Delta T$ 550 as the input and converts $\Delta T$ 550 into a fuzzy membership function through fuzzification. According to ASHRAE thermal sensation scale, ISO 14505-2:2006 and each individual heating/cooling device's physical characteristics, location and corresponding body segments the exemplary system 500 defines four environment temperature fuzzy sets 560, 562, 564, 566 (member functions) for each zone, as shown in FIG. 7A, and 4 fuzzy sets 570, 572, 574, 576 for heating/cooling set temperatures, as shown in FIG. 7B. The fuzzy logic controller 520 applies fuzzy rules and decides the output value, i.e., the inference mechanism. Through defuzzification, the control module 540 converts the fuzzy output to real life data value which is used as a temperature set point for the device. FIG. 6 is a typical control flowchart for designing a fuzzy logic controlled heating/cooling device.

The temperature set point 552 is provided to the controller 540, which uses any suitable control scheme to provide a pulse width modulation (PWM) signal 542 to the given thermal effector 530 controlling the thermal effector 530 to the setpoint. The NTC within the thermal effector 530 provides feedback to the sensor fusion algorithm 510, as well as a summing junction 534 between the temperature set point to provide a corrected signal to the control scheme.

Figure 8:
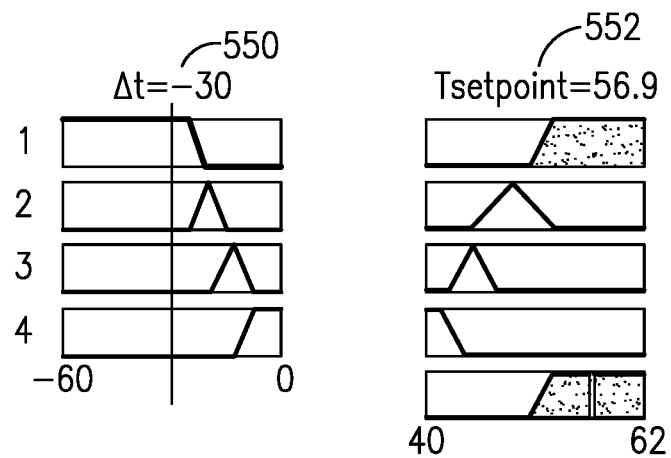
FIG. 8 schematically illustrates an example fuzzy set based upon ΔT for a give thermal comfort effector.

The fuzzy sets account for the uncertainty relating to the application of the ASHRAE thermal sensation scale to any given occupant. The "1" value indicates 100% certainty that the entire population would agree with the indicated thermal sensation, and the "0" value indicates that the entire population would disagree with the indicated thermal sensation. An example of the fuzzy sets based upon $\Delta T$ 550 for a give thermal comfort effector 530 is shown in FIG. 7A and the left side of FIG. 8. The sloped lines reflect the variation within the population as to whether the indicated thermal sensation applies to the population of occupants. Where sloped lines overlap at a given $\Delta T$ 550, the population is divided as to its perceived thermal comfort. For example, at −10 ΔT 550, 50% of the population would feel "slightly cool", and 50% of the population would feel "neutral." The fuzzy sets are determined using the ΔT 550 to produce the temperature set point 552 for the given thermal effector, as shown in FIG. 7B and the right side of FIG. 8. The specific values illustrated in FIGS. 7A, 7B and 8 are exemplary only and the values will vary depending on the specifics of the system 500 and the thermal effector 530.

Figure 9:
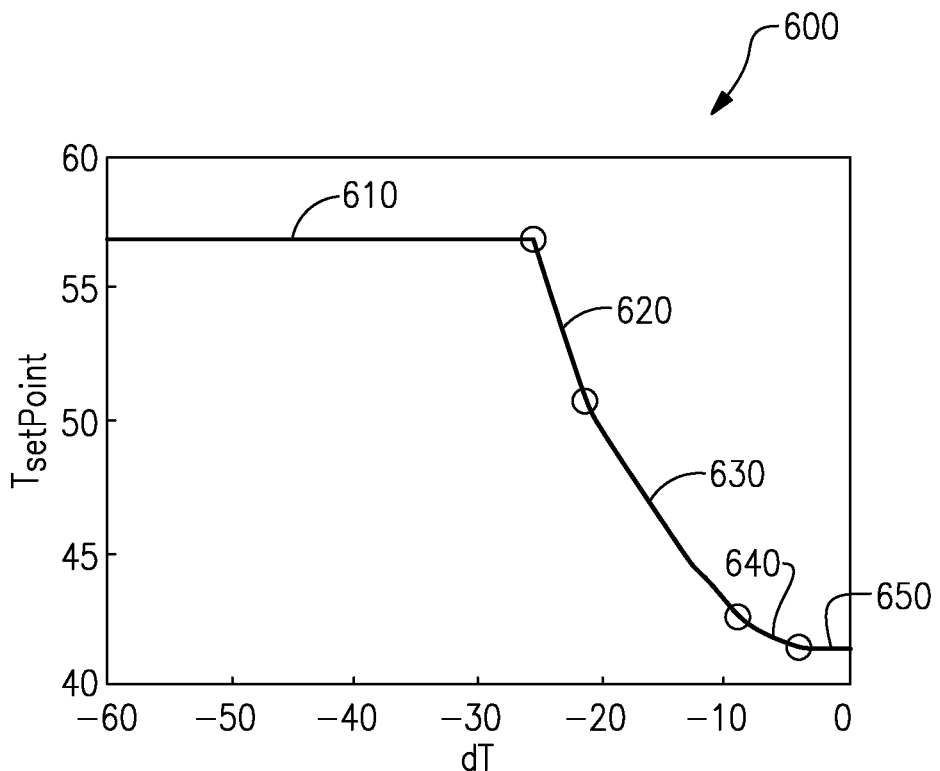
FIG. 9 shows an exemplary fuzzy logic controller output plot for heating.

FIG. 9 shows an exemplary fuzzy logic controller output plot 600 for heating. The output plot 600 discloses multiple exemplary regions 610, 620, 630, 640, 650 with 610 representing the "0" value where no users would be comfortable and 650 representing the "1" value where every user is comfortable. Intervening regions 620, 630, 640 represent intermediate regions where some users are expected to be comfortable and other users are expected to be uncomfortable.

The fuzzy logic control temperature can be based on SISO (single input single output) 1D control or MIMO (multiple inputs multiple outputs) multi-dimensional control. Additional inputs and outputs can be included, such as fan airflow rate, humidity etc. and the controls can be implemented according to any SISO or MIMO control scheme.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A microclimate system for a vehicle occupant comprising:
multiple microclimate thermal effectors, each of the microclimate thermal effectors being configured to at least partially control a climate in at least one occupant zone of multiple defined occupant zones, each of the microclimate thermal effectors including a sensor configured to determine microclimate temperature data corresponding to the at least one occupant zone;
a controller in communication with the microclimate thermal effectors, the controller having an input configured to receive vehicle temperature data from a vehicle data bus, the vehicle temperature data includes at least a cabin temperature and an outside air temperature, the controller being configured to fuse the microclimate temperature data with the vehicle temperature data and determine an estimated local equivalent temperature for each of the microclimate thermal effectors based on the fused data, the controller further being configured to provide a temperature command to each of the microclimate thermal effectors based upon the estimated local equivalent temperature corresponding to the microclimate thermal effector.

2. The microclimate system of claim 1, further including a thermal control system in the vehicle having a first temperature sensor exposed to conditioned air from the thermal control system.

3. The microclimate system of claim 2, wherein the thermal control system in the vehicle is a heating ventilation and cooling (HVAC) system and the first temperature sensor is configured to detect the cabin temperature.

4. The microclimate system of claim 2, comprising a second temperature sensor exposed to air outside the vehicle, the second temperature sensor configured to detect the outside air temperature.

5. The microclimate system of claim 4, wherein multiple zones include at least two of a head zone, a seat back zone, a seat cushion zone, a hand/arm zone and a foot/leg zone.

6. The microclimate system of claim 5, wherein the microclimate thermal effectors are selected from the group comprising climate controlled seats, head rest/neck conditioner, climate controlled headliner, steering wheel, heated gear shifter, heater mat, and mini-compressor system.

7. The microclimate system of claim 6, wherein the controller is configured to apply a stratification offset to the cabin temperature to adjust for a location of the cabin temperature sensor.

8. The microclimate system of claim 6, wherein weighting factors are applied to the outside air temperature and the cabin temperature.

9. The microclimate system of claim 8, wherein a value of each weighting factors is dependent on at least one of a season and a climate region.

10. The microclimate system of claim 6, wherein the vehicle temperature data includes a vehicle solar load.

11. The microclimate system of claim 10, wherein the vehicle solar load is normalized, and a weighting factor is applied to the vehicle solar load, wherein the weighting factor compensates for vehicle specific features.

12. The microclimate system of claim 6, wherein the vehicle temperature data includes a vehicle speed.

13. The microclimate system of claim 12, wherein a weighting factor is applied to the vehicle speed wherein the weighting factor compensates for the seat's surrounding area effectors, including heating devices in a door panel and a floor area.

14. The microclimate system of claim 6, wherein a temperature feedback from at least one microclimate thermal effector is provided to the controller, and wherein the expected local temperature is determined for the at least one microclimate thermal effector based upon temperature feedback.

15. The microclimate system of claim 14, wherein the controller is configured to fuse the microclimate temperature data with the vehicle temperature data based upon the following equation:

$$T_{local} = W_1 \times (T_{cabin} + b_{tv}) + W_2 \times T_{outside} + W_3 \times SL_{nor} + W_4 \times V + W_5 \times T_{lf}$$

Where: $W_i$ i+1, 2, 3, 4, 5; calibratable weighting factor
$T_{cabin}$ cabin temperature
$b_{tv}$ temperature vertical stratification factor or offset
$T_{outside}$ outside temperature
$SL_{nor}$ normalized sunload
V vehicle speed
$T_{lf}$ local effector temperature feedback.

16. The microclimate system of claim 15, wherein the controller determines a unique estimated local equivalent temperature for each of the selected microclimate thermal effectors based upon the equation.

\* \* \* \* \*